United States Patent [19]

Gapen

[11] 4,161,838
[45] Jul. 24, 1979

[54] FISHING IMPLEMENT

[76] Inventor: Daniel D. Gapen, Rte. 1, Big Lake, Minn. 55309

[21] Appl. No.: 812,803

[22] Filed: Jul. 5, 1977

[51] Int. Cl.² ............................................ A01K 85/00
[52] U.S. Cl. .................................................. 43/42.11
[58] Field of Search .................. 43/42.11, 42.13, 42.39

[56] References Cited

U.S. PATENT DOCUMENTS

| 3,253,363 | 5/1966 | Steehn | 43/42.13 |
| 3,750,325 | 8/1973 | Feltman | 43/42.39 |
| 3,808,726 | 5/1974 | Flanagan | 43/42.13 |
| 3,828,463 | 8/1974 | Perrin | 43/42.11 |
| 3,890,736 | 6/1975 | Worden | 43/42.11 |

Primary Examiner—Harold D. Whitehead
Attorney, Agent, or Firm—Wicks & Nemer

[57] ABSTRACT

A fishing implement arranged for attachment to a reel-line and for attaching a fishing hook assembly is disclosed including, in the preferred embodiment, an L-shaped wire member having first and second legs. In the preferred embodiment, a reel-line attachment loop is formed at the junction of the first and second legs by twisting a length of spring wire forming the L-shaped wire member. A swivel attached to an attaching loop on the second leg is provided for attaching the fishing hook assembly to the fishing implement. A sinker having a substantially snagless shape is attached to the first leg. The first leg extends in a substantially tangential manner from the sinker. Due to the location of the attachment loop forward and above the sinker, and also the snagless shape of the sinker, the fishing implement is able to rock to a secondary position having a greater vertical orientation such that the fishing implement is able to raise itself over and dislodge itself from obstructions.

2 Claims, 3 Drawing Figures

FISHING IMPLEMENT

BACKGROUND

The present invention relates generally to fishing implements, and more particularly, to a fishing implement arranged for attachment to a reel-line and for attaching a fishing hook assembly.

With the increasing amounts of leisure time available to persons generally in modern society, an increasing need has been felt for hobbies to occupy such leisure time. A select class of such hobbies that has been generally favored are outdoor related activities, especially those around bodies of water. Fishing is within this selected class and is favored by many. Therefore, a need has arisen for fishing implements to aid the angler in catching fish.

SUMMARY

A preferred embodiment of the present invention includes an angle member having first and second elongated legs, with a loop arranged for attachment to the reel-line being located at the junction of the first and second legs. The fishing hook assembly is attached to the second leg. A sinker, having a substantially snagless shape, is further provided attached to the first leg. The attachment loop is located forward and above the sinker for allowing the sinker to rock to a secondary position having a greater vertical orientation such that the fishing implement is able to raise itself over obstructions.

It is thus a primary object of the present invention to provide a novel fishing implement.

It is further an object of the present invention to provide such a fishing implement for working the fishing hook assembly on the water bottom.

It is further an object of the present invention to provide such a fishing implement for trolling the fishing hook assembly in a manner preventing twisting of the fishing hook assembly.

It is further an object of the present invention to provide such a fishing implement for elevating the fishing hook assembly.

It is further an object of the present invention to provide such a fishing implement for properly presenting the fishing hook assembly while trolling, drifting, river fishing, or still fishing.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
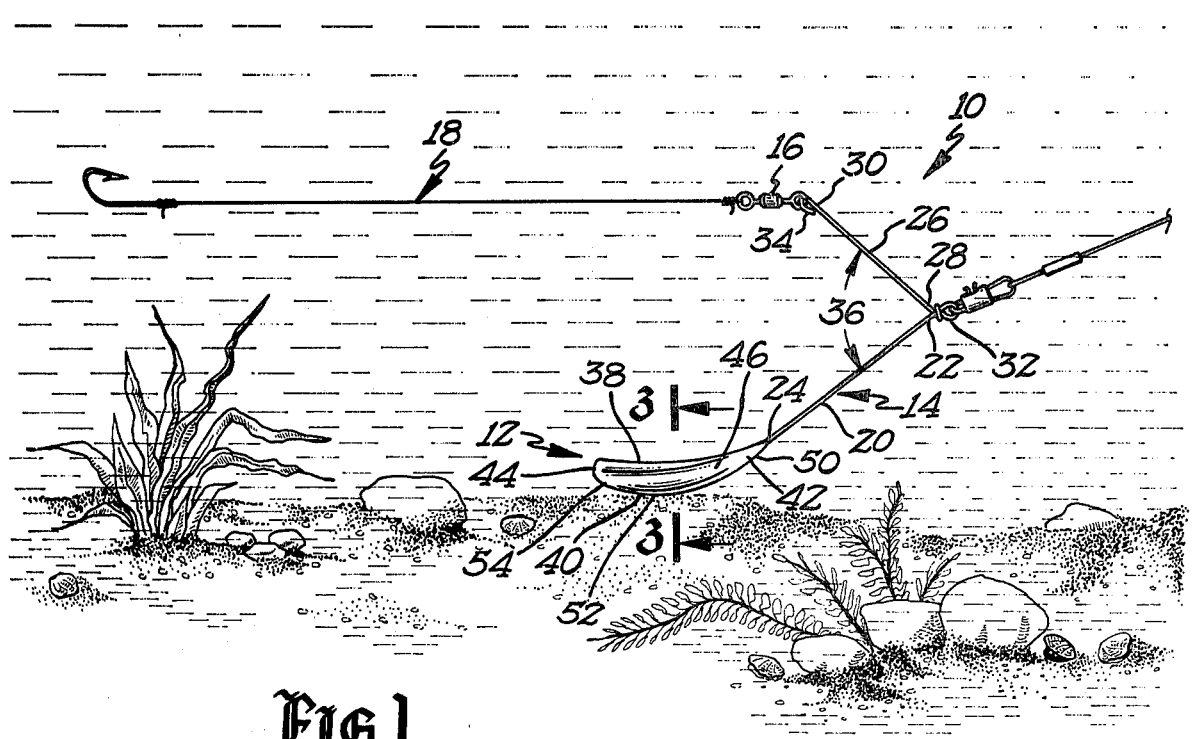
FIG. 1 shows a side view of a fishing implement according to the teachings of the present invention working a fishing hook assembly on the water bottom.

All figures are drawn for ease of explanation of the basic teachings of the present invention only; the extensions of the figures with respect to number, position, relationships, and dimensions of the parts to form preferred embodiment will be explained or will be obvious once the explanation is read and understood.

Where used in the various figures of the drawings, the same numerals designate the same or similar parts in the various figures. Furthermore, when the terms "first", "second", "top", "bottom", "side", "vertical", and similar terms are used herein, it should be understood that these terms have reference only to the structure shown in the drawings, as it would appear to a person viewing the drawings, and are utilized only to facilitate describing the invention.

DESCRIPTION

A fishing implement arranged for attachment to a reel-line, according to the teachings of the present invention, is generally shown in the figures and designated 10. Implement 10 generally comprises a sinker portion 12, an angle member shown in its preferred form as L-shaped spring wire portion 14, and a swivel portion 16 for attaching the desired fishing hook assembly, generally designated 18, such as a drop-back line and hook as shown in FIG. 1.

Specifically, L-shaped spring wire 14 includes a first elongated wire leg 20 having a first end 22 and a second end 24, a second elongated wire leg 26 having a first end 28 and a second end 30, a reel-line attachment loop 32, and a swivel attachment loop 34. In the preferred embodiment, leg 26 is shorter than leg 20, and legs 20 and 26 and loops 32 and 34 are integrally formed from a length of spring wire. More specifically, end 22 of leg 20 is joined to end 28 of leg 26 by a twist forming loop 32 at their junction. Loop 32 is arranged for attachment to the reel-line. In the preferred embodiment, the angle 36 between leg 20 and leg 26 of wire 14 is approximately 90°. It should then be noted that loop 32 formed in legs 20 and 26 adds the necessary strength to legs 20 and 26 so that angle 36 does not decrease in normal operation and will return to its equilibrium position if decreased under stress conditions and thus implement 10 can hold fishing hook assembly 18, including a fish lure and its drop-back line, in a proper position. In the preferred embodiment, swivel attachment loop 34 is formed by bending the second end 30 of second wire leg 26. Swivel 16, as available and well known in the art, is attached to L-shaped spring wire 14 by loop 34 before loop 34 is closed. Thus, swivel 16 and loop 34 are provided for attaching fishing hook assembly 18 to second end 30 of leg 26 of implement 10.

Sinker 12 is attached to end 24 of leg 20 of wire 14, and, in the preferred form, sinker 12 is cast upon end 24 of leg 20 of wire 14. Sinker 12 has a substantially snagless shape to gain the marked advantages of the present invention including the ability to dislodge easily from the bottom surface of the fishing waters and also the ability to stabilize implement 10 in use. Specifically, sinker 12 includes a top surface 38, a bottom surface 40, a first end 42, a second end 44 opposite to end 42, and first and second sides 46 and 48, respectively. Leg 20 extends from first end 42 of sinker 12.

In the preferred embodiment, top surface 38 is generally flat to gain the advantages of the present invention. Specifically, prior to the present invention, the top surfaces of sinkers were rounded, and therefore such sinkers did not run at a constant depth but ran up and down. The flat top surface 38 of the present invention allows implement 10 to run at a constant depth, and will not go up and down as sinkers of the prior art. Additionally, top surface 38 aids in the ability of implement 10 to sit up, i.e. maintain a vertical orientation, such that loop 34 is located in a vertical position above sinker 12 for holding the fish lure and drop-line attached to swivel 16 in a proper position. Furthermore, due to surface 38 being flat, the weight of sinker 10 can be reduced.

Bottom surface 40 is of a semi-arcuate shape for aiding in dislodging sinker 12 from bottom structures such that sinker 12 is able to walk over obstructions. Specifically, bottom surface 40 includes a first, generally straight portion 50, a second, generally rounded portion 52, and a third, generally raised end portion 54. Leg 20 of wire 14 extends from first portion 50 of bottom surface 40. It should then be noted that portion 50 and leg 20 of wire 14 extend in a generally tangential manner from portion 52. Thus, leg 20 of wire 14 extends substantially tangentially from sinker 12, and specifically, from bottom surface 40 of sinker 12, and more particularly from rounded portion 52 of sinker 12. It can then be noted that leg 20 and bottom surface 40 present an advancement plane which is generally straight, and specifically lies along leg 20 of implement 10. It can then be appreciated that due to the tangential relationship of leg 20 with sinker 12, sinker 12 presents no edges for snagging or catching upon bottom structures.

It can also be noted that first end 42 of sinker 12 is tappered having a narrow, tear drop shape which also helps prevent snagging in brush, weeds, and rocks on the water bottom. Thus, top surface 38, bottom surface 40, and sides 46 and 48 taper together and form tear drop shape end 42 of sinker 12.

Sides 46 and 48 have a shape which flows from end 42 and follow through with the contour of end 42. Specifically, sides 46 and 48 have a dynamic shape related to surfaces 38 and 40 and end 42 such that sides 46 and 48 minimize the water flow disturbance around sinker 12 and also do not present edges for snagging or catching on bottom structures.

Likewise, it can be noted that end 44 is rounded and is slightly dished up so that end 44 minimizes the water flow disturbance around sinker 12 and also does not present edges for snagging or for catching on bottom structures. Specifically, top and bottom surfaces 38 and 40, respectively, and sides 46 and 48 round and dish up together to form end 44 of sinker 12. It then should be noted that end 44 has a dynamic shape related to surfaces 38 and 40 and sides 46 and 48.

It should then further be noted that in addition to top surface 38, bottom surface 40, ends 42 and 44, and sides 46 and 48 aid in the ability of implement 10 to sit up.

Sinker 12 can also operate as an attractor for hook assembly 18 attached to swivel 16 of implement 10. For example, sinker 12 can be formed of fluorescent material which will attract fish to implement 10 while it is in the water.

Now that the basic structure of implement 10 has been set forth, the advantages and operation of implement 10 can be explained and appreciated. First, implement 10 elevates hook assembly 18, which may be of any fishing lure type known in the art, above sinker 12. Therefore, for example, if implement 10 is located on the bottom surface, hook assembly 18 is elevated above the bottom surface. This is especially advantageous when live bait is used in that the live bait is not damaged by hitting the bottom surface. Further, hook assembly 18 may include fish hooks of the type which often inherently snag on the bottom surface. Since implement 10 of the present invention elevates such fish hooks above the bottom, the present invention reduces the possibility of snagging by such fish hooks.

It can now also be noted that, due to the ability of implement 10 according to the teachings of the present invention to sit up, hook assembly 18 is insured to be in an elevated position. Further, wire 14 is substantially rigid and insures that hook assembly 18 is held in an elevated position.

Prior to the present invention, T-shaped swivels were known and used having a sinker attached by monofilm line to the T-shaped swivel and a hook assembly also attached to the T-shaped swivel. However, the hook assembly often went to the bottom thus damaging the live lure and/or snagging the bottom surface in that the monofilm line is not rigid and did not insure that the hook assembly remained elevated.

Additionally, if hook assembly 18 of the present invention does become snagged on the bottom surface, implement 10 allows retrieval of implement 10 without loss of any of the reel-line. Specifically, the drop-back line of hook assembly 18 should have a tensional strength less than that of the reel-line. If hook assembly 18 should snag the bottom surface, the reel-line can then be pulled such that the drop-back line breaks freeing implement 10 and the reel-line. Thus, only hook assembly 18 remains snagged while implement 10 and the reel-line can be retrieved.

Figure 2:
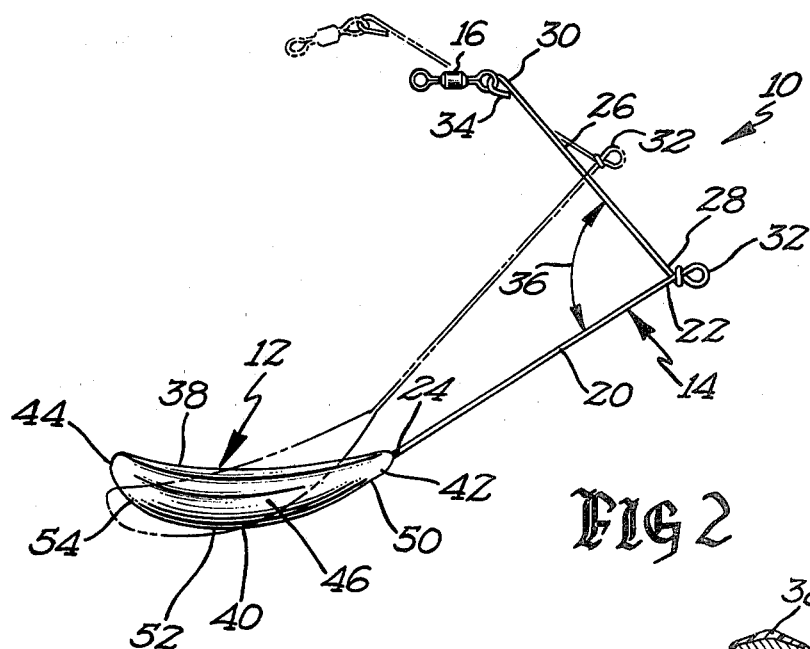
FIG. 2 shows a side view of the fishing implement of FIG. 1.
Figure 3:
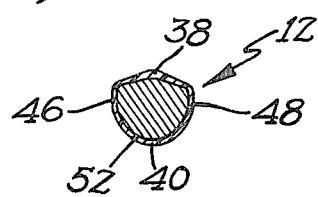
FIG. 3 shows a sectional view of the fishing implement of FIG. 1 according to the section line 3—3 of FIG. 1.

Second, and more importantly, sinker 12 of the present invention is also virtually snagless and is able to dislodge easily from the bottom structure. It should be initially noted that loop 32 is located forward and above sinker 12 such that the point of pull of reel-line lifts or rocks sinker 12 over obstacles. Specifcally, due to the location of loop 32, when the reel-line is initially moved, or sinker 12 engages a bottom obstruction, implement 10 lifts from its normal position as shown in solid in FIG. 2 and rocks to a secondary position as shown in phantom in FIG. 2 such that the portion of bottom portion 40 which engages the bottom surface is closer to end 44 of sinker 12. Therefore, sinker 12 has a greater vertical orientation and is able to raise itself over the obstruction. Thus, implement 10 is able to rock itself over obstructions located on the water bottom. It should be noted that the arcuate shape of bottom surface 40 aids in this rocking motion of implement 10.

It can then be appreciated that the location of loop 32 is centered for balance and fulcrum action. Specifically the location of loop 32 where the reel-line is attached allows the following action: If implement 10 is stationary or is steadily moved with fishing assembly 18, implement 10 will remain in its normal position; While if implement 10 is accelerated in movement or engages an obstruction, implement 10 will exhibit a fulcrum action and rock over the water obstruction. Further, swivel 16 is located above sinker 12 and loop 32 and forward of sinker 12 to further balance implement 10 when hook assembly 18 is attached thereto.

Also, it should be noted that wire 14 has a spring-like effect that also aids in the release of sinker 12 if it should engage a water obstruction.

Additionally, sinker 12 is less prone to snagging due to the tangential manner in which wire 20 extends from portions 50 and 52 of sinker 12, the narrow, tear-drop shape of end 42 of sinker 12, and the lack of snagging edges of surfaces 38 and 40, sides 46 and 48, and end 44 of sinker 12 as explained hereinbefore.

Third, implement 10 does not spin and therefore prevents rotating of the fishing assembly 18. For example, implement 10 can be used as a trolling rig for salmon with a drop-back line of 6 to 10 feet and a favorite rig such as a fly or spoon. Implement 10 then prevents the drop-back line from twisting. Implement 10 gives such fishing assembly 18 a ruddering effect and thus prevents spinning and twisting.

It should be noted that sinkers 12 can be of various sizes and weights to attain the proper depth desired for fishing assembly 18. Although implement 10 is particularly advantageous for use when it is desired to work fishing assembly 18 right on the water bottom due to its substantially snagless operation, implement 10 can be used where different heights above the water bottom are desired. The depth of implement 10 in the water then depends on various factors including the size and weight of sinker 12 and the relative velocity of the water with respect to implement 10, as from the speed of a boat, speed of moving water, or the speed of reel-in.

Fourth, implement 10 can be used as a still fish rig in either a lake or a river. For example, the drop-line of fishing assembly 18 may include a small foam bait float near the live bait hook. Due to the ability of implement 10 to stay upright, the float is able to raise the bait off the bottom while still fishing. If it is desired to change the bait position, reel-line is moved causing implement 10 to move forward on the bottom as previously described.

It can now be appreciated that the entire implement 10 of the preferred embodiment according to the teachings of the present invention is balanced perfectly to obtain the marked advantages of the present invention.

Thus, since the invention disclosed herein may be embodied in other specific forms without departing from the spirit or the general characteristics thereof, some of which forms have been indicated, the embodiment described herein is to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. Fishing implement arranged for attachment to a reel-line and for attaching a fishing hook assembly for working the fishing hook assembly on the water bottom, for trolling the fishing hook assembly in a manner preventing twisting of the fishing hook assembly, for elevating the fishing hook assembly, or for properly presenting the fishing hook assembly while trolling, drifting, river fishing, or still fishing, comprising, in combination: an L-shaped spring wire having a first wire leg including a first end and a second end and a second wire leg including a first end and a second end, with the first ends of the first and second legs being joined by a twist forming a reel-line attachment loop at their junction; a loop formed on the second end of the second leg for attaching the fishing hook assembly to the fishing implement; and a sinker attached to the second end of the first leg, with the sinker being of a substantially snagless shape and including: a top surface, a bottom surface, a first end, a second end opposite to the first end, and first and second sides, with the bottom surface including: a first, generally straight portion, a second, generally rounded portion, and a third, generally raised end portion, with the first portion and the first leg extending in a generally tangential manner from the second portion for presenting an advancement plane which is generally straight and having no edges for snagging or catching on obstructions, with the top surface being generally flat for allowing the fishing implement to run at a constant depth and for aiding the fishing implement to maintain a vertical orientation, with the first end having a tear drop shape formed from the tappering together of the top surface, the bottom surface, and the first and second sides, with the second end being rounded and slightly dished up and formed from the top surface, the bottom surface, and the first and second sides rounding and dishing up together, with the first and second sides flowing from the first end and following through with the contour of the first end, for minimizing the water flow disturbance around the sinker and for presenting no edges for snagging or catching obstructions, and with the attachment loop being formed forward and above the sinker and the attaching loop being located above the attachment loop and the sinker for allowing the sinker to rock to a secondary position having a greater vertical orientation such that the fishing implement is able to raise itself over obstructions.

2. The fishing implement of claim 1 wherein the attaching means is located forward of the sinker to further balance the fishing implement when the fishing hook assembly is attached thereto.

* * * * *